US011248980B2

(12) United States Patent
Van Roosbroeck et al.

(10) Patent No.: US 11,248,980 B2
(45) Date of Patent: Feb. 15, 2022

(54) OPTICAL SENSING SYSTEM

(71) Applicants: FBGS Technologies GmbH, Jena (DE); FBGS International NV, Geel (BE)

(72) Inventors: Jan Van Roosbroeck, Hulshout (BE); Johan Vlekken, Diepenbeek (BE); Bram Van Hoe, Gentbrugge (BE); Eric Lindner, Jena (DE)

(73) Assignee: FBGS TECHNOLOGIES GMBH, Geel (BE)

( * ) Notice: Subject to any disclaimer, the term of this patent is extended or adjusted under 35 U.S.C. 154(b) by 58 days.

(21) Appl. No.: 16/369,416

(22) Filed: Mar. 29, 2019

(65) Prior Publication Data

US 2019/0301960 A1  Oct. 3, 2019

(30) Foreign Application Priority Data

Mar. 30, 2018 (EP) .................................... 18165351

(51) Int. Cl.
| | | |
|---|---|---|
| *G01L 19/14* | (2006.01) | |
| *G01K 11/3206* | (2021.01) | |
| *G01L 11/02* | (2006.01) | |
| *G01L 19/06* | (2006.01) | |
| *G01L 19/00* | (2006.01) | |
| *E21B 47/07* | (2012.01) | |
| *E21B 47/017* | (2012.01) | |
| *E21B 47/06* | (2012.01) | |

(52) U.S. Cl.
CPC .......... *G01L 19/149* (2013.01); *E21B 47/017* (2020.05); *E21B 47/07* (2020.05); *G01K 11/3206* (2013.01); *G01L 11/025* (2013.01); *G01L 19/0092* (2013.01); *G01L 19/0627* (2013.01); *G01L 19/14* (2013.01); *E21B 47/06* (2013.01)

(58) Field of Classification Search
CPC ..................................................... G01L 19/14
See application file for complete search history.

(56) References Cited

U.S. PATENT DOCUMENTS

| | | | | |
|---|---|---|---|---|
| 5,385,053 A | * | 1/1995 | Wlodarczyk | ......... G01L 9/0077 250/227.23 |
| 5,673,341 A | * | 9/1997 | Takesue | .................. G01N 21/03 250/227.11 |
| 2007/0292071 A1 | * | 12/2007 | Zerwekh | .................. G01L 19/14 385/12 |

FOREIGN PATENT DOCUMENTS

CN  101545817 A  9/2009

OTHER PUBLICATIONS

European Search Report from EP Application No. 18165351.0, dated Sep. 10, 2018.

(Continued)

*Primary Examiner* — Paul M. West
*Assistant Examiner* — Mark A Shabman
(74) *Attorney, Agent, or Firm* — Workman Nydegger (57) ABSTRACT

A sensor system for sensing pressure of a first fluid (e.g. a liquid and/or gas) comprises an optical sensing fiber that is configured for sensing pressure, and at least one sensor housing embedding the optical sensing fiber. The sensor housing is filled with a second fluid. The sensor housing comprises a non-hermetic pressure transfer medium comprised in the sensor system and positioned in the sensor housing such that a pressure of the first fluid can be transferred via the pressure transfer medium onto the second fluid towards the optical sensing fiber for determining based thereon a pressure of the first fluid.

20 Claims, 7 Drawing Sheets

(56) References Cited

OTHER PUBLICATIONS

Shou et al., "On-line Monitoring System for Downhole Temperature and Pressure," Optical Engineering, vol. 53, No. 8, Aug. 2014, 6 Pages.
Eck et al., "Downhole Monitoring: The Story So Far," Oilfield Review, Winter 1999/2000, pp. 20-33.

* cited by examiner

OPTICAL SENSING SYSTEM

FIELD OF THE INVENTION

The present invention generally relates to an optical sensor for sensing pressure. More particularly, the present invention relates to a packaged optical sensing fiber for measuring pressure, whereby the pressure sensitivity, and/or the pressure response time, and/or the temperature pressure cross sensitivity is mainly determined by the optical sensing fiber properties and not by the sensor housing of the sensor.

BACKGROUND OF THE INVENTION

There are two curial parameters that needs to be monitored or either being tracked in a downhole well, which are the temperature and the pressure. These data can be used to optimize the production output of the well, the exploration method that should be carried out and the economic value of the well. The latter has been described by Ma et al. in Opt. Eng. 53(8) (2014) 087102. Furthermore, depending on different applications, a monitoring system can be sorted into a long-term monitoring system or a short-term troubleshooting monitoring system, as described by Eck et al. in Oilfield Review (1999) 20-33.

To this purpose, fiber Bragg grating (FBG) based optical fiber sensors have benefited from its numerous advantages in downhole applications such as no requirement on the electrical power at the sensing element, inherent sensitive to temperature, high resistance to the harsh environment. With respect to the temperature monitoring in downhole environment, a well-calibrated FBG can simply achieve this target with a significant temperature sensitivity. However, when it comes to the pressure monitoring in downhole environment, most of the commercially available pressure sensors rely on a sensor packaging, which also affects the pressure sensitivity, and/or the temperature cross sensitivity, and/or the pressure response time of the FBG sensor. The influences of the sensor packaging on these parameters are not always preferred but difficult to avoid.

SUMMARY OF THE INVENTION

It is an object of embodiments of the present invention to provide good optical fiber based sensors for sensing pressure, whereby the pressure sensitivity, and/or the pressure response time, and/or the temperature pressure cross sensitivity is mainly determined by the optical sensing fiber.

It is an advantage of embodiments of the present invention that sensors are provided for pressure sensing and/or are provided for combined pressure and temperature sensing.

It is an advantage of at least some embodiments of the present invention that sensors are provided that are capable of separating the temperature information from pressure information with a negligible temperature pressure cross-sensitivity.

It is an advantage of embodiments of the present invention that sensor systems are provided that have a sensor housing that not only offers mechanical protection of the fiber, but also provides for pressure transfer from the well fluid to the optical sensing fiber.

It is an advantage of embodiments of the present invention that the pressure transfer mechanism is designed such that no additional temperature pressure cross sensitivity is induced.

It is an advantage of embodiments of the present invention that sensing with an operational temperature and pressure up to at least 150° C. and 700 bar, respectively, can be performed.

The present invention relates to a sensor system for sensing pressure of a first fluid, the sensor system comprising an optical sensing fiber that is configured for sensing pressure, at least one sensor housing embedding the optical sensing fiber, whereby the sensor housing is filled with a second fluid, the sensor housing containing a non-hermetic pressure transfer medium comprised in the sensor system and positioned in the sensor housing such that a pressure of the first fluid can be transferred via the pressure transfer medium onto the second fluid towards the optical sensing fiber for determining based thereon a pressure of the first fluid.

The optical sensing fiber in the sensor housing is in a non-hermetic way in connection with the second fluid in the sensor housing.

The pressure on the optical sensing fiber thus may be applied directly, without there being a hermetic sealed inner housing transferring a force from the second fluid on the hermetic sealed inner housing onto the optical sensing fiber.

The sensor system may comprise an open inner housing comprised in the sensor housing. The inner housing may be open such that the second fluid can be positioned both in the inner housing and in a remainder part of the sensor housing.

The first fluid may be a liquid or a gas. The second fluid also may be a liquid or a gas.

It is an advantage of embodiments of the present invention that the sensor housing of the sensor system does not or only little contribute to the pressure sensitivity, and/or the pressure response time, and/or the temperature pressure cross-sensitivity of the sensor system, so that the pressure sensitivity, and/or the pressure response time, and/or temperature pressure cross sensitivity of the sensor system is mainly defined by the pressure sensitivity, and/or the pressure response time, and/or temperature pressure cross sensitivity of the optical sensing fiber. It is an advantage of embodiments of the present invention that no air bubbles are permanently trapped inside the sensor housing. It is an advantage of embodiments of the present invention that air bubbles which are temporarily inside the sensor housing, will not affect the pressure sensitivity, and/or the pressure response time, and/or the temperature pressure cross-sensitivity of the sensor.

The pressure transfer medium may be chosen such that the sensor housing of the sensor system does not or only little contribute to the pressure sensitivity, and/or the pressure response time, and/or the temperature pressure cross-sensitivity of the sensor system, so that the pressure sensitivity, and/or the pressure response time, and/or temperature pressure cross sensitivity of the sensor system is mainly defined by the pressure sensitivity, and/or the pressure response time, and/or temperature pressure cross sensitivity of the optical sensing fiber.

It is an advantage of embodiments of the present invention that the pressure sensitivity, and/or the pressure response time, and/or the temperature pressure cross sensitivity is at least for 50% determined by the optical sensing fiber.

The pressure transfer medium may be a rigid structure such as for example a metal pressure filter.

The pressure transfer medium may be a sintered metal pressure filter.

The system furthermore may comprise a pressure barrier for providing isolation between the fluid inside the sensor housing and the connection fiber for reading out the optical signal of the optical sensing fiber.

The first fluid may be a liquid or a gas. In some embodiments, the first fluid is a liquid.

The second fluid may be a liquid or a gas. In some embodiments, the second fluid is a liquid.

The optical sensing fiber may comprise a Fiber Bragg Grating.

The optical sensing fiber may comprise a Fabry-Perot sensing element.

The optical sensing fiber may be a micro-structured fiber.

The optical sensing fiber furthermore may be configured for measuring temperature.

The pressure transfer medium may be adapted for keeping the second fluid inside the housing. A particular porosity may be selected for the pressure transfer medium.

The pressure transfer medium may be adapted such that the mixing of the second fluid with the first fluid is minimized or even not occurring. A particular porosity may be selected for the pressure transfer medium.

The second fluid may be in direct contact with the optical sensing fiber.

The system may comprise an inner housing comprised in the sensor housing, the inner housing being in open connection with the fluid in the sensor housing and giving additional protection to the optical sensing fiber such that for example the fiber cannot bend (e.g. the inner housing being a perforated capillary, surrounding the fiber).

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the present invention can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

Where in embodiments of the present invention reference is made to temperature pressure cross sensitivity, reference is made to the fact that if the temperature changes, the pressure also seemingly changes while this is not necessarily the case in reality. Typically, sensors need to be compensated for this. According to embodiments of the present invention, the temperature pressure cross sensitivity can be kept low due to the fact that the fiber used has a relatively low temperature pressure cross sensitivity and due to the fact that the temperature pressure cross sensitivity is mainly determined by the fiber. The influence of the housing on the temperature pressure cross sensitivity is, according to embodiments of the present invention, limited.

In a first aspect, the present invention relates to a sensor system for sensing pressure of a first fluid. The first fluid may be a liquid or a gas. It may for example be oil, water, gas, etc. The sensor system may for example be especially suitable for downhole applications, e.g. applications in oil, gas or water industry. According to embodiments of the present invention, the sensor system comprises an optical sensing fiber that is configured for sensing pressure and at least one sensor housing embedding the optical sensing fiber, whereby the sensor housing is filled with a second fluid. The second fluid may be a liquid or a gas. According to embodiments of the present invention, the sensor housing contains a non-hermetic pressure transfer medium comprised in the sensor system and positioned in the sensor housing such that a pressure of the first fluid can be transferred via the pressure transfer medium onto the second fluid towards the optical sensing fiber for determining based thereon a pressure of the first fluid.

The optical sensing fiber in the sensor housing is in a non-hermetic way in connection with the second fluid in the sensor housing.

The sensor system may comprise an inner housing comprised in the sensor housing. The inner housing may be open such that the second fluid can be positioned both in the inner housing and in a remainder part of the sensor housing.

In particular embodiments, the optical sensing fiber used is a micro-structured fiber. The optical sensing fiber may comprise a Fiber Bragg Grating. The optical sensing fiber may for example be an optical sensing fiber as described in European patent application EP2502102, the specification thereof being incorporated herein by reference, although embodiments are not limited thereto.

In particular embodiments, the pressure transfer medium may for example be selected such that the housing of the sensor system does not or only little contribute to the pressure sensitivity, and/or the pressure response time, and/or the temperature pressure cross-sensitivity of the sensor system. In other words, the pressure sensitivity, and/or the pressure response time, and/or temperature pressure cross sensitivity of the sensor system is mainly, e.g. at least for 50% such as e.g. at least for 60%, such as e.g. at least for 70%, such as e.g. at least for 80%, e.g. at least for 90%, e.g. at least for 99% defined by the pressure sensitivity, and/or the pressure response time, and/or temperature pressure cross sensitivity of the optical sensing fiber. The pressure transfer medium may be a rigid structure. It may be a metal pressure filter, such as for example a sintered metal pressure filter. Filter porosities may in some exemplary embodiments be between 1 μm and 100 μm. Examples of materials that can be used, although embodiments are not limited thereto, are aluminum, stainless steel, titanium, super duplex steel, etc.

In particular embodiments, the at least one housing is filled with a second fluid. Examples of such a fluid may be silicon oil or mineral oil, although embodiments are not limited thereto.

In particular embodiments, the at least one housing may be made of one of the following materials: stainless steel 316, super duplex steel, titanium, Inconel, although embodiments are not limited thereto.

Figure 1:
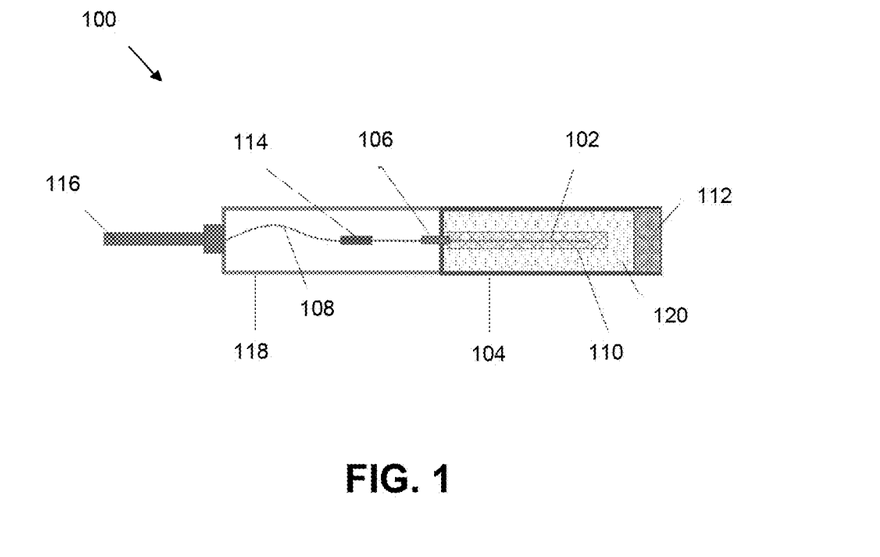
FIG. 1 shows a schematic design of a packaged MS-FBG sensor as can be used in embodiments of the present invention

By way of illustration, embodiments of the present invention not being limited thereto, an exemplary sensor system 100 will be described below, illustrating standard and optional features and advantages. A schematic overview of the overall design of the exemplary packaged micro-structure FBG based sensor system 100 is shown in FIG. 1. The sensor system 100 is based on a micro-structure FBG sensor (MS-FBG sensor) being capable of monitoring up to 280° C. in temperature and up to 1400 bar in pressure simultaneously. More importantly, a negligible temperature-pressure cross-sensitivity of this sensor and the unique sensing principle to directly measure the pressure renders the sensor system a good candidate in the oil and gas industry. The sensor system 100 according to the present example is implemented with protection on the sensing element, i.e. the optical sensing fiber 102, in order to meet the downhole requirements. The main functionality of the sensor housing 104 is to offer a protection to the fragile part of the optical sensing fiber 102, allowing the optical sensing fiber 102 to be transported, handled, installed and delivered safely to the measurement location and to protect the optical sensing fiber 102 during in-field operation from the harsh environment. In the meantime, the sensor housing 104 should not jeopardize the pressure integrity in downhole environment and should allow a fully transfer from the well fluid to the optical sensing fiber 102. Besides, the well fluid and well particles should be kept away from the optical sensing fiber 102. The fluid, referred to as second fluid 120, around the optical sensing fiber 102 may be controlled.

Figure 2:
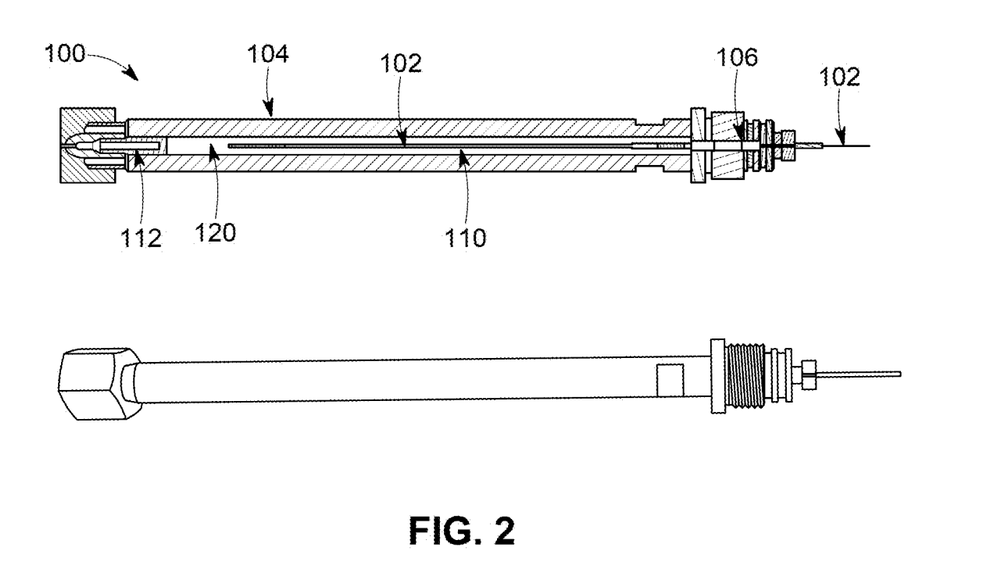
FIG. 2 shows an overall design schematics and photo of an exemplary packaged MS-FBG sensor as can be used in embodiments of the present invention.

The packaged MS-FBG sensor system 100 according to the present example comprises of 5 different parts, including the MS-FBG optical sensing fiber 102, the pressure barrier 106 for connecting the optical sensing fiber 102 to a connection fiber 108 for reading out the signal, the inner sensor housing 110, the sensor housing 104 and the non-hermetic pressure transfer medium 112 as shown in FIG. 1 and FIG. 2. The functionality of each part will be discussed below.

The optical sensing fiber 102 used in the present example is an FBG written by femtosecond laser in micro-structured fiber, to accomplish simultaneously pressure and temperature sensing, spliced to a high NA polyimide coated fiber (Fibercore SM1500(6.4/125)P) as the lead-in fiber. The production of MS-FBG is known to the person skilled in the art. Practically, the length of the micro-structured optical sensing fiber 102 can be optimized not only for minimizing overall sensor size but also for maximizing the grating production per unit length. The lead-in fiber goes via a pressure barrier 106 to the connection/splice chamber 118 where the lead-in fiber is connected using a fiber splice 114 to the connection fiber 108 coming from the connection cable 116 for reading out the reflection signal. The connection fiber 108 and the fiber splice 114 are in the present example positioned in the connection/splice chamber 118. The grating position is placed 4 cm away from the end of the MSF optical sensing fiber 102, far away enough to avoid affecting by the sealing of micro-hole structure as it is necessary in pressure sensing.

The pressure barrier 106 used in the present example needs to provide a good isolation between the fluid pressure inside the sensor housing 104 and the connection fiber 116 which might be coupled to the atmospheric pressure area. The pressure barrier 106 in the exemplary system consists of 2 sub-parts: (1) a part that the lead-in fiber is hermetically sealed in a high pressure capillary and (2) other part that a compressed ferrule is fixed on the capillary together with a gland nut. To this purpose, the sealing around the lead-in fiber assures that no leakage between the lead-in fiber and the inner capillary wall occurs and the compressed ferrule and gland nut assure the sealing between the outer capillary wall and the sensor housing 104.

The inner sensor housing 110 serves as an additional mechanical protection for the part of the MS-FBG optical sensing fiber 102.

The sensor housing 104 is in the present example made of marine grade stainless steel 316 which offers a main mechanical protection in the final environment as shown in FIG. 2. The sensor housing 102 is also provided with a flange, a larger thread and grooves for a pair of O-ring seals in order to be mounted onto a connection or splice chamber 118. The connection or splice chamber 118 has the function to connect the connection cable 116 to the sensor housing 104 and house the splice 114 between the connection fiber 108 coming from the connection cable 116 and the lead-in fiber 102 of the optical sensing fiber. The other end of the sensor housing 104 is made to hold the filter (sintered metal) for the pressure transfer, also referred to as the pressure transfer medium 112, and is also provided with a thread to make a direct connection to the end cap to lock the filter.

Figure 3A:
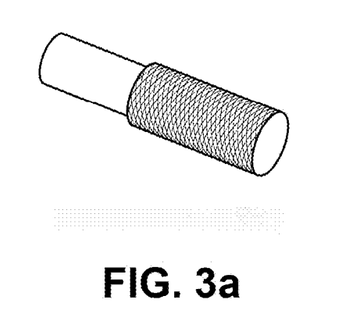
FIGS. 3a and 3b illustrate a filter (a) and a filter in a holder (b), as can be used in embodiments of the present invention.
Figure 3B:
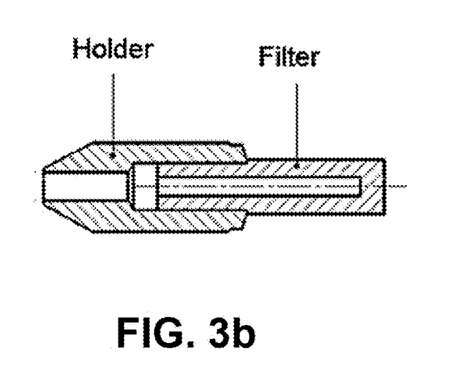

The pressure transfer medium 112 consists of a sintered metal high pressure filter with porosity between 1 μm and 100 μm, e.g. 5 μm, mounted in a holder, see FIGS. 3a and 3b. In this way, the well fluid pressure can be transferred into the sensor, which is filled with silicon oil (Dow Corning 710) beforehand. More importantly, the well fluid and its containments can be kept outside the sensor.

Further, experimental results of the packaged MS-FBG sensor are now discussed.

Figure 4:
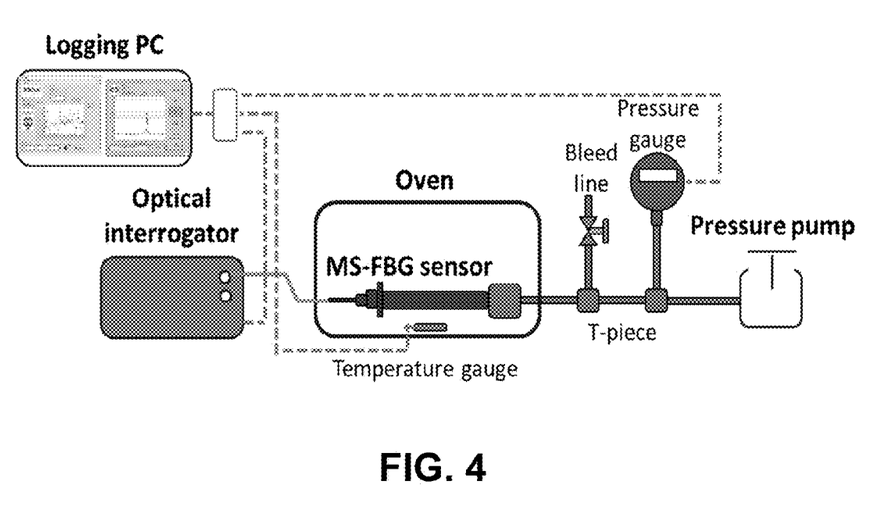
FIG. 4 shows a drawing of an experimental set-up for pressure calibration at various temperatures.

The pressure sensitivity of the packaged MS-FBG sensor is determined within the working pressure and temperature operating range. For this, the packaged MS-FBG sensor is connected via a high pressure fitting to a hydraulic pressure calibration set-up in combination with an oven, as shown in FIG. 4. The reference readings are logged with a digital pressure gauge and a temperature gauge. In the optical part, the Bragg resonances of the MS-FBG are tracked with an optical interrogator making use a depolarized light source. Eventually, all the information is transmitted and combined into an external PC for data processing.

Figure 5A:
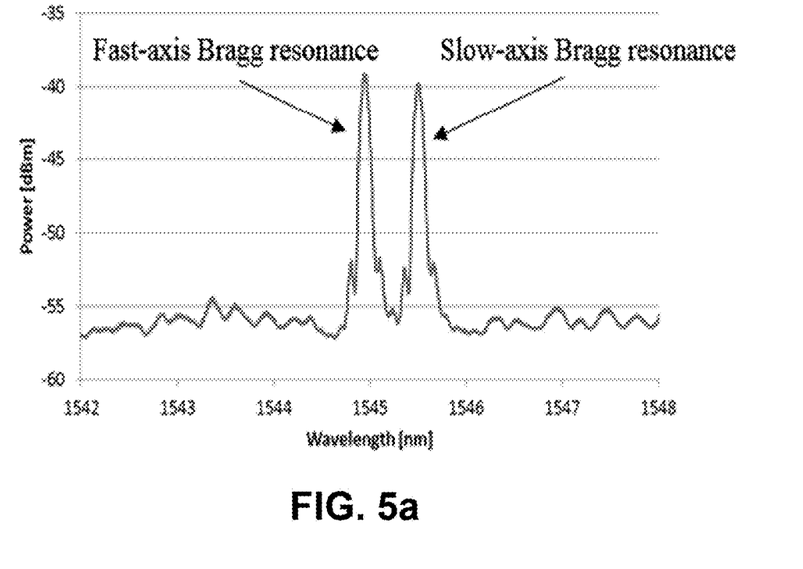
FIG. 5a illustrates Bragg resonance wavelength spectrum of an MS-FBG sensor, as can be used in embodiments of the present invention.
Figure 5B:
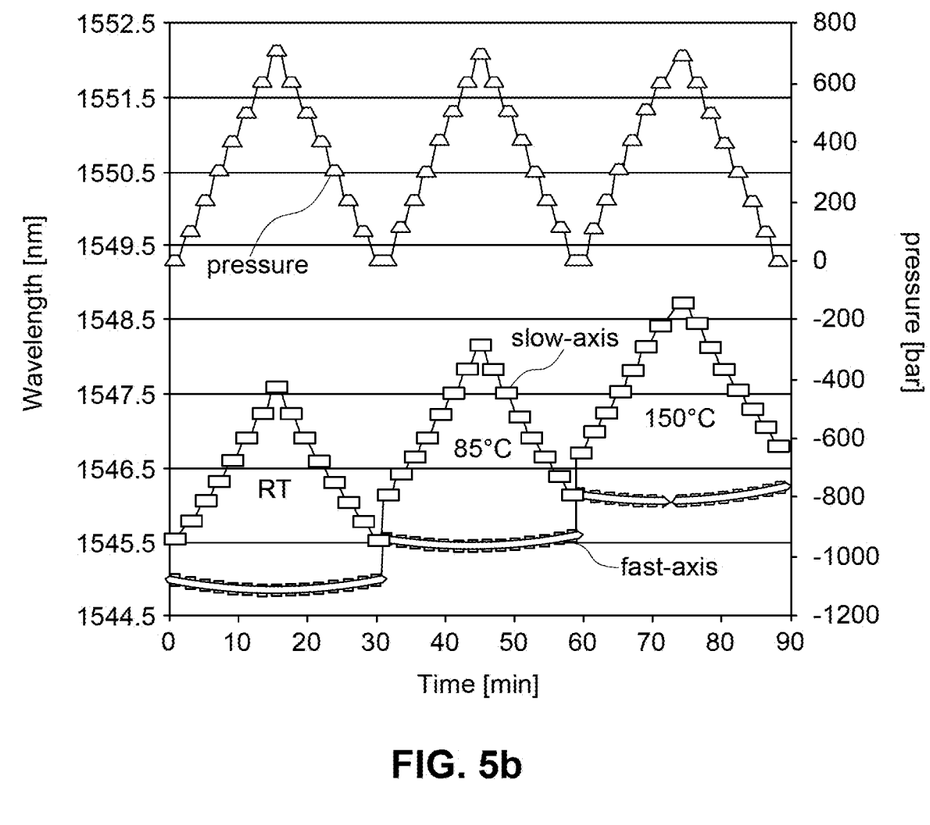
FIG. 5b illustrates Bragg resonance responses of packaged MS-FBG sensor in pressure calibration at three different temperatures, illustrating characteristics of particular embodiments of the present invention.

The pressure calibration is performed from 0 to 700 bar in steps of 100 bar and this at 3 different temperatures (Room Temperature, 85° C. and 150° C.). The waiting time for each pressure step is set to 1 minute with a 1 Hz data logging rate. FIG. 5a illustrates the Bragg resonance wavelength spectrum of an MS-FBG sensor, as can be used in embodiments of the present invention. FIG. 5b presents the Bragg resonance responses of the packaged MS-FBG sensor for the pressure calibrations at three different temperatures. The slow-axis Bragg resonance has a positive and obvious significant pressure sensitivity while the fast-axis Bragg resonance has a negative and minor pressure sensitivity.

Figure 6:
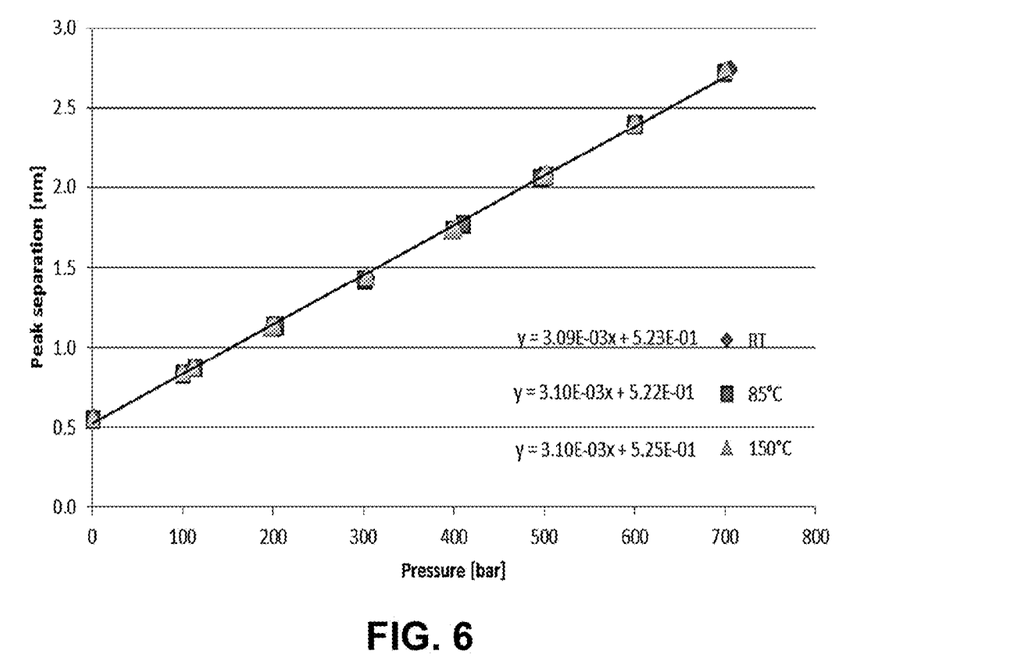
FIG. 6 illustrates the pressure sensitivity of peak separation of a packaged MS-FBG sensor at three different temperatures, illustrating characteristics of particular embodiments of the present invention.

In FIG. 6, the pressure calibration of the peak separation is presented for the three different temperatures. It can be seen that all three calibration curves are nicely overlapping. This can be explained because both peaks of the MS-FBG sensor see the temperature effect almost as a common mode effect and so temperature changes are significantly reduced when monitoring the evolution of the peak separation. It can furthermore be observed that the peak separation changes almost linear with the pressure, resulting into a sensitivity of about 3.1 pm/bar. The pressure barrier did not show any signs of oil leakages, which is advantageous in order to keep the silicon oil inside the sensor housing and in order to avoid the fluid becoming pushed through the connection cable.

Figure 7A:
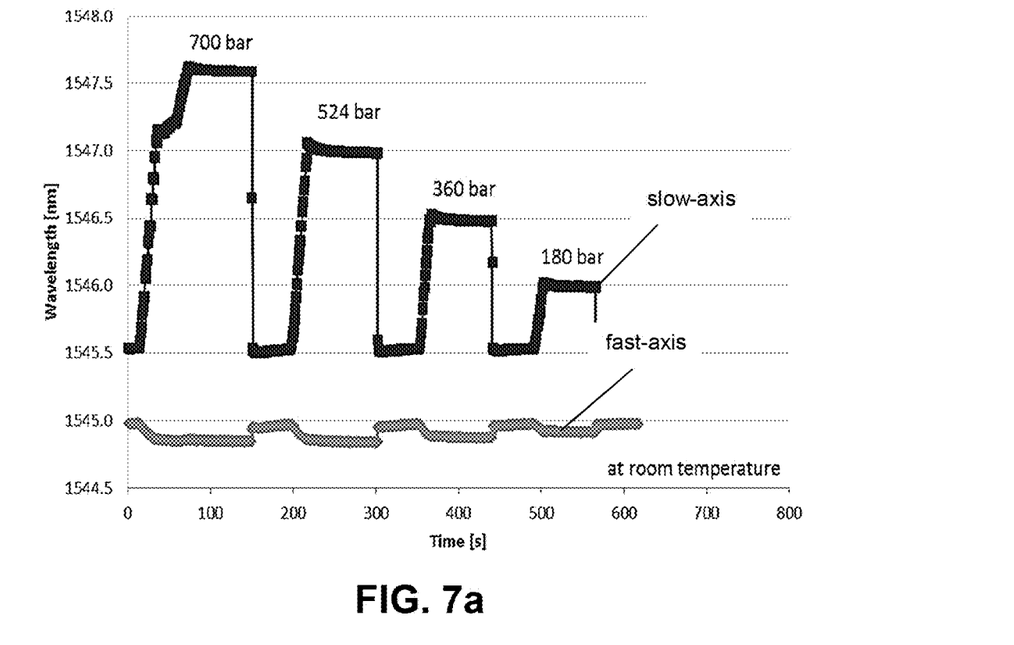
FIG. 7a illustrates the pressure response time of packaged MS-FBG sensor at room temperature, illustrating characteristics of particular embodiments of the present invention.
Figure 7B:
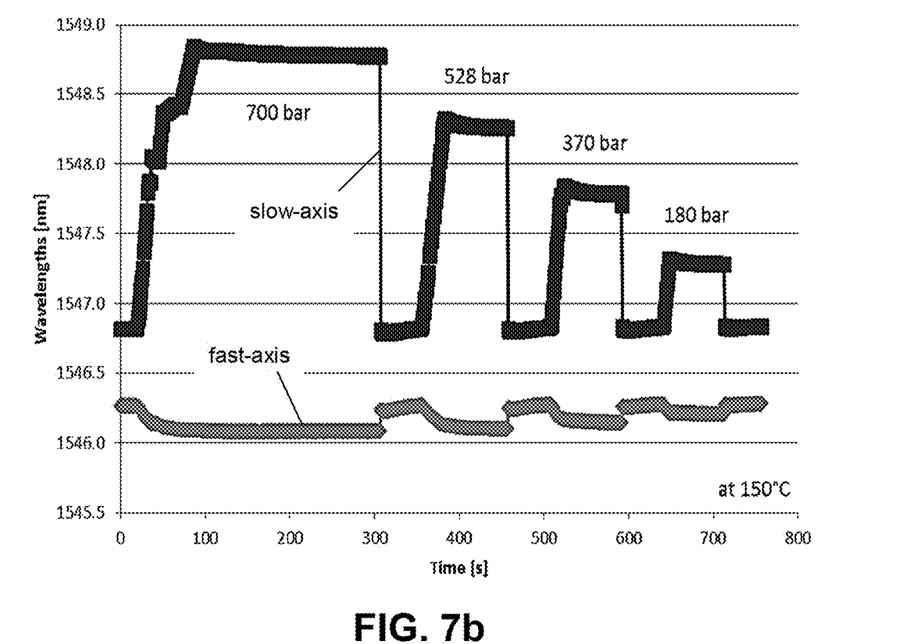
FIG. 7b illustrates the pressure response time of packaged MS-FBG sensor at 150° C., illustrating characteristics of particular embodiments of the present invention.

Next, the response time of the package MS-FBG sensor when exposed to a rapid pressure change is determined. In this test, the sensor is exposed to a rapid pressure drop that was applied by opening the valve of the bleed line as shown in FIG. 4. The drop was applied from different starting values, given as 100%, 75%, 50% and 25% of the maximum operation pressure of 700 bar. The test was done at room temperature and at 150° C., see FIG. 7a and FIG. 7b. The fiber optic sensing interrogator is set to have a fixed sampling rate of 2 Hz and so this dictates the lower limit for the response time determination. FIGS. 7a and 7b present the evolution of the Bragg resonances in the pressure response time tests at room temperature and at 150° C. respectively. It can be observed that the pressure response time of the packaged MS-FBG sensor is almost instantaneous within the operation temperature and pressure range. In some cases, an intermediate point can be captured in the transient states. Therefore, it can be stated that the pressure response time is of the order of 1 second or faster.

Figure 8:
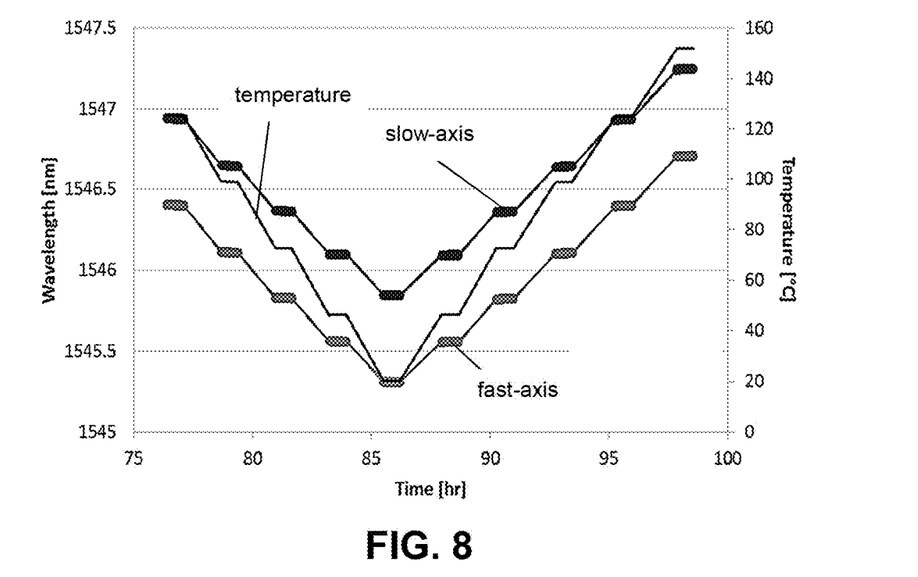
FIG. 8 illustrates Bragg resonance evolutions of the packaged MS-FBG sensor in temperature calibration, illustrating characteristics of particular embodiments of the present invention.

Next, the temperature sensitivity of the packaged MS-FBG sensor within the working temperature range at atmospheric pressure is determined. For this purpose, a packaged MS-FBG sensor is placed in the climatic chamber. The Bragg resonances are logged every 30 seconds by the same optical interrogator. The temperature calibration ranges from 20° C. to 150° C. in steps of 26° C. for one full cycle. In each step, the sensor evolution is monitored for 2 hours. Note that it is necessary to set the waiting time long because of the relatively large thermal mass around the sensing element coming from the protecting housing and the oil around it. FIG. 8 expresses the Bragg resonance evolutions during the temperature calibration. Due to the thermal inertia, only the last 0.7 hour of each step is stable. Only these stable measurements are shown in the figure.

Figure 9A:
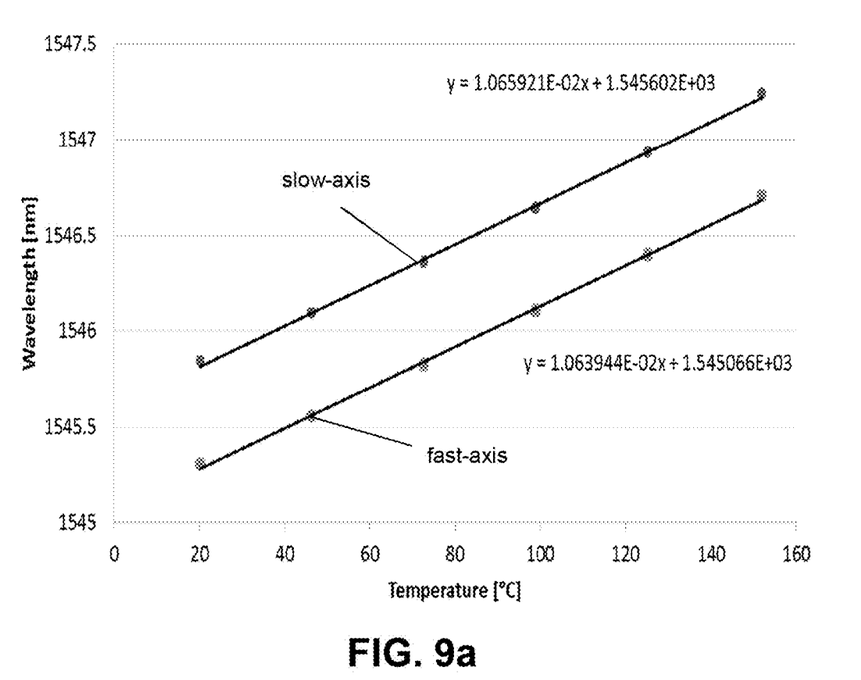
FIG. 9a illustrates individual Bragg resonance and FIG. 9b illustrates peak separation responses and its fits results in temperature calibration, illustrating characteristics of particular embodiments of the present invention.
Figure 9B:
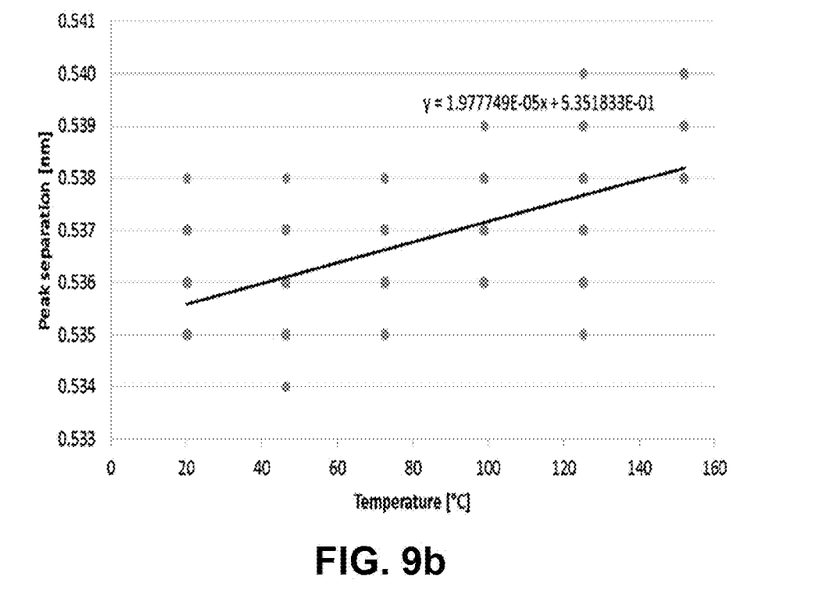

To calculate the temperature sensitivity of each Bragg resonance and that of the peak separation, a linear approach is used as shown in FIGS. 9a and 9b. A sensitivity of 10.63 pm/° C., 10.65 pm/° C. and 0.019 pm/° C. is obtained for the fast-axis, slow-axis Bragg resonance and peak separation respectively.

Since the pressure was constant (atmospheric pressure) during the test, the residual temperature sensitivity of the peak separation is a measure for the temperature pressure cross sensitivity, which can be estimated by dividing the temperature sensitivity of the peak separation with the pressure sensitivity. Doing so yields a value of $6.25 \times 10^{-3}$ bar/° C. This very small value is very much comparable with the cross sensitivity of the bare MS-FBG, which is $6.06 \times 10^{-3}$ bar/° C. The minor difference is related to the slightly different pressure sensitivity coming from the difference in the tested pressure range (1400 bar compared to 700 bar, which resulted into a sensitivity 3.3 pm/bar compared to 3.1 pm/bar).

Finally, the temperature response time and the pressure error when the sensor is exposed to a thermal shock is evaluated. A packaged MS-FBG sensor was put in the oven at 150° C. for several hours to ensure that the internal temperature is stabilized. Then, the sensor is put in water at room temperature (RT) in order to create a sudden change in temperature. The whole process is monitored with a interrogator monitoring both polarization states and with a sampling rate at 10 Hz, to monitor both Bragg resonance wavelengths.

Figure 10A:
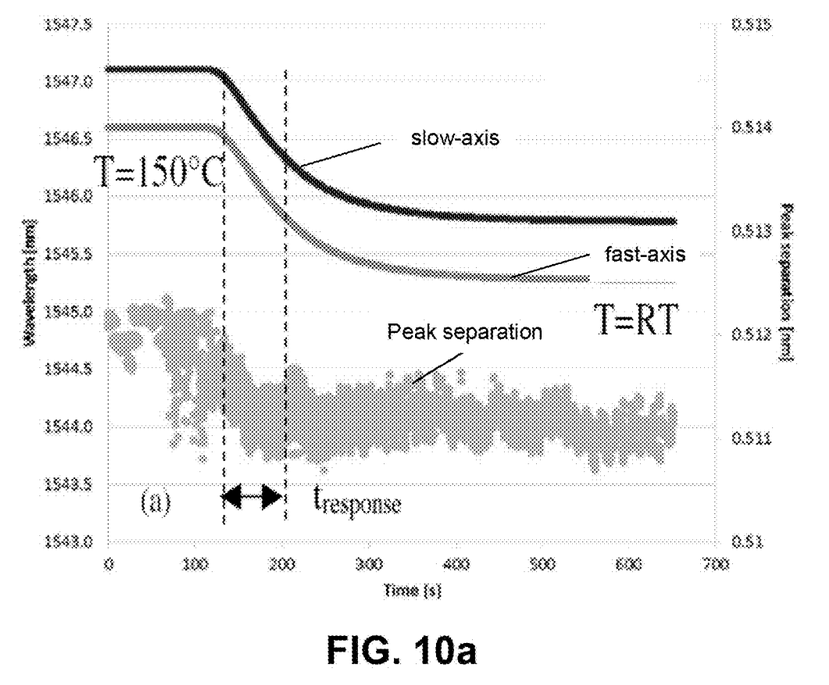
FIG. 10a illustrates the Bragg resonance evolution and FIG. 10b illustrates the calculated pressure and temperature from wavelength variation in the thermal shock test, illustrating characteristics of particular embodiments of the present invention.

FIG. 10a presents the Bragg wavelength evolutions of the packaged MS-FBG sensor during the thermal shock test. As can be observed, it takes several minutes before the sensor is stabilized for temperature. This is of course considerably longer than the fiber alone (second like response time) due the large difference in thermal mass of the sensor housing and the fluid inside the sensor housing. However, during this stabilization period, the peak separation which is a measure for the pressure, is changing only around 1 pm over a temperature change of 130° C. We can verify the temperature sensitivity of peak separation of this sensor is around 0.008 pm/° C. (=1 pm/130° C.), which is very comparable to the value we have determined using the temperature calibration.

Figure 10B:
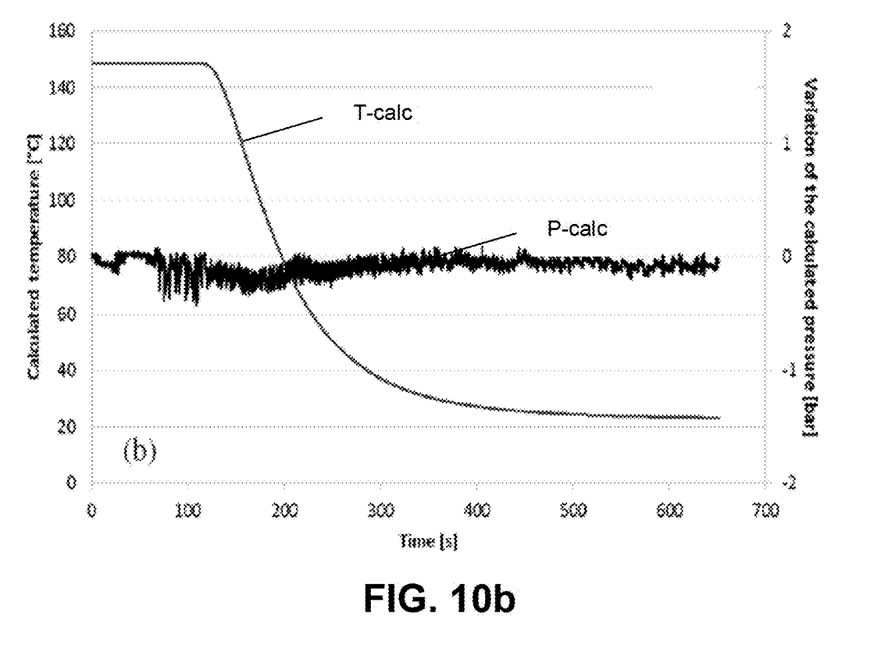

Next, the calibration parameters of this packaged MS-FBG sensor can be listed here: temperature sensitivity are 10.54 pm/° C., 10.55 pm/° C. for fast-axis and slow-axis Bragg resonance and pressure sensitivity are −0.285 pm/bar, 2.8 pm/bar for fast-axis and slow-axis Bragg resonance. With these parameters, we can obtain the pressure and the temperature reading simultaneously based on the change of individual Bragg resonance through linear approach, see FIG. 10b. As can be observed, the calculated temperature reading from the packaged MS-FBG sensor follows nicely the change of the environmental temperature. In the meantime, the calculated pressure reading stays relatively stable with less than 0.25 bar difference during the temperature transient.

In one aspect, the present invention also relates to the use of a sensor system as described in the first aspect for measuring at least pressure of a first fluid. The present invention also relates to a method for measuring at least pressure of a first fluid, using a sensor system as described above. According to an advantage of embodiments of the present invention, the method may result in a measurement of the pressure or a measurement of the pressure and the temperature whereby the cross-sensitivity between pressure and temperature is limited.

The invention claimed is:

1. A sensor system for sensing pressure of a first fluid, the sensor system comprising:
    an optical sensing fiber that is configured for sensing pressure,
    at least one sensor housing embedding the optical sensing fiber, wherein the sensor housing is filled with a second fluid,
    the sensor housing containing a non-hermetic pressure transfer medium comprised in the sensor system and positioned in the sensor housing such that a pressure of the first fluid can be transferred via the pressure transfer medium onto the second fluid towards the optical sensing fiber for determining based thereon a pressure of the first fluid, wherein the optical sensing fiber is in a non-hermetic way in connection with the second fluid in the sensor housing, and wherein the system comprises an inner housing comprised in the sensor housing, the inner housing being in open connection with the second fluid in the sensor housing and giving additional protection to the optical sensing fiber such that the optical sensing fiber cannot bend.

2. The sensor system according to claim 1, wherein the second fluid is a liquid.

3. The sensor system according to claim 1, wherein the pressure transfer medium is chosen such that the sensor housing of the sensor system does not contribute to the pressure sensitivity, and/or the pressure response time, and/or the temperature pressure cross-sensitivity of the sensor system, so that the pressure sensitivity, and/or the pressure response time, and/or temperature pressure cross sensitivity of the sensor system is mainly defined by the pressure sensitivity, and/or the pressure response time, and/or temperature pressure cross sensitivity of the optical sensing fiber.

4. The sensor system according to claim 1, wherein the pressure transfer medium is a rigid structure.

5. The sensor system according to claim 1, wherein the pressure transfer medium is a sintered metal pressure filter.

6. The sensor system according to claim 1, wherein the system furthermore comprises at least one pressure barrier for providing isolation between the second fluid inside the sensor housing and a connection fiber that is used for reading out the optical signal of the optical sensing fiber.

7. The sensor system according to claim 1, wherein the optical sensing fiber comprises a Fiber Bragg Grating.

8. The sensor system according to claim 1, wherein the optical sensing fiber comprises a Fabry-Perot sensing element.

9. The sensor system according to claim 1, wherein the optical sensing fiber is a micro-structured fiber.

10. The sensor system according to claim 1, wherein the optical sensing fiber furthermore is configured for measuring temperature.

11. The sensor system according to claim 1, wherein the pressure transfer medium is adapted for keeping the second fluid inside the housing.

12. The sensor system according to claim 1, wherein the pressure transfer medium is adapted such that the second fluid does not mix with the first fluid.

13. The sensor system according to claim 1, wherein the second fluid is in direct contact with the optical sensing fiber.

14. The sensor system according to claim 1, wherein the inner housing is a perforated capillary.

15. The sensor system according to claim 1, wherein the pressure transfer medium is chosen such that the pressure sensitivity, and/or the pressure response time, and/or temperature pressure cross sensitivity of the sensor system is mainly defined, by at least 50%, by the pressure sensitivity, and/or the pressure response time, and/or temperature pressure cross sensitivity of the optical sensing fiber.

16. The sensor system according to claim 1, wherein the pressure transfer medium is a metal pressure filter.

17. A method of measuring a pressure of a first fluid, the method comprising:

providing a sensor system for sensing pressure of the first fluid, the sensor system including an optical sensing fiber that is configured for sensing pressure, at least one sensor housing embedding the optical sensing fiber, wherein the sensor housing is filled with a second fluid, the sensor housing containing a non-hermetic pressure transfer medium comprised in the sensor system and positioned in the sensor housing such that a pressure of the first fluid can be transferred via the pressure transfer medium onto the second fluid towards the optical sensing fiber for determining based thereon a pressure of the first fluid, wherein the optical sensing fiber is in a non-hermetic way in connection with the second fluid in the sensor housing, and wherein the system comprises an inner housing comprised in the sensor housing, the inner housing being in open connection with the second fluid in the sensor housing and giving additional protection to the optical sensing fiber such that the optical sensing fiber cannot bend; and measuring the pressure of the first fluid using the sensor system.

18. A sensor system for sensing pressure of a first fluid, the sensor system comprising:

an optical sensing fiber embedded within a sensor housing, the optical sensing fiber being configured to sense pressure;

wherein the sensor housing is filled with a second fluid;

wherein directly between the first fluid and the second fluid, the sensor system further comprises a non-hermetic pressure transfer medium positioned in the sensor housing such that a pressure of the first fluid can be transferred towards the optical sensing fiber through the pressure transfer medium such that the optical sensing fiber can determine a pressure of the first fluid;

wherein the optical sensing fiber is in contact with the second fluid in the sensor housing through a non-hermetic connection with the second fluid in the sensor housing, and wherein the sensor system further comprises an inner housing within the sensor housing, the inner housing being in open connection with the second fluid in the sensor housing and giving additional protection to the optical sensing fiber.

19. The sensor system according to claim 18, wherein at least a portion of the second fluid is within the inner housing and at least a portion of the second fluid is outside the inner housing.

20. The sensor system according to claim 18, wherein the second fluid is in direct contact with the optical sensing fiber and the second fluid is in direct contact with the non-hermetic pressure transfer medium.

* * * * *